(12) United States Patent
Nakai et al.

(10) Patent No.: US 9,017,640 B2
(45) Date of Patent: Apr. 28, 2015

(54) METHOD FOR PRODUCING HIGH-PURITY NICKEL SURFACE

(71) Applicant: Sumitomo Metal Mining Co., Ltd., Tokyo (JP)

(72) Inventors: Takayuki Nakai, Niihama (JP); Tatsuya Higaki, Niihama (JP); Yoshitomo Ozaki, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

(21) Appl. No.: 14/359,312

(22) PCT Filed: Nov. 19, 2012

(86) PCT No.: PCT/JP2012/079985
§ 371 (c)(1),
(2) Date: May 20, 2014

(87) PCT Pub. No.: WO2013/077296
PCT Pub. Date: May 30, 2013

(65) Prior Publication Data
US 2014/0322109 A1   Oct. 30, 2014

(30) Foreign Application Priority Data

Nov. 22, 2011  (JP) ................................ 2011-255547

(51) Int. Cl.
| C01G 53/10 | (2006.01) |
| --- | --- |
| C22B 3/04 | (2006.01) |
| C22B 3/26 | (2006.01) |
| C22B 3/00 | (2006.01) |
| H01M 10/30 | (2006.01) |

(52) U.S. Cl.
CPC ............ *C22B 23/0469* (2013.01); *C01G 53/10* (2013.01); *C22B 3/0005* (2013.01); *C22B 23/0453* (2013.01); *H01M 10/30* (2013.01)

(58) Field of Classification Search
CPC ...... C01G 53/10; C01G 53/003; C22B 3/0005
See application file for complete search history.

(56) References Cited

U.S. PATENT DOCUMENTS

| 7,563,421 B2 | 7/2009 | Kobayashi et al. | |
| --- | --- | --- | --- |
| 2006/0067874 A1* | 3/2006 | Fetcenko et al. | 423/544 |

FOREIGN PATENT DOCUMENTS

| GB | 2 400 368 | 10/2004 |
| --- | --- | --- |
| JP | 10-30135 | 2/1998 |
| JP | 10-60552 | 3/1998 |
| JP | 10-310437 | 11/1998 |
| JP | 2002-121624 | 4/2002 |
| JP | 2002-326820 | 11/2002 |
| JP | 2004-307270 | 11/2004 |
| JP | 2005-350766 | 12/2005 |

OTHER PUBLICATIONS

International Search Report of Feb. 12, 2013.

* cited by examiner

*Primary Examiner* — Timothy Vanoy
(74) *Attorney, Agent, or Firm* — Gerald E. Hespos; Michael J. Porco; Matthew T. Hespos

(57) ABSTRACT

Provided is a production method for obtaining high purity nickel sulfate having low levels of impurities, particularly low levels of magnesium and chloride, by adjusting the concentration of an extractant and the pH concentration at the time of treatment in a process of obtaining a nickel sulfate solution having a high nickel concentration by solvent extraction using an acidic organic extractant.

8 Claims, 2 Drawing Sheets

METHOD FOR PRODUCING HIGH-PURITY NICKEL SURFACE

BACKGROUND

1. Field of the Invention

The present invention relates to a method for producing high purity nickel sulfate which can be utilized in a field in which it is intended to obtain high purity nickel sulfate that can be used in a battery material with less impurities, particularly less magnesium, manganese and calcium, from an acidic solution containing nickel.

2. Description of the Related Art

Nickel is widely used as a material for stainless steel or corrosion-resistant alloys, and recently, nickel is also used to a large extent as a material for nickel hydrogen batteries or lithium ion batteries that are used in hybrid electric cars, mobile telephones, personal computers, and the like.

Nickel used in such a material is produced by mining mineral ores that exist in the form of sulfide ore or oxide ore, and smelting the mineral ores.

For example, as a method applicable in the case of treating sulfide ores, the ores are introduced into a furnace to melt, impurities are separated therefrom as slag, and thereby a matte of concentrated nickel is obtained. This matte is dissolved in sulfuric acid or hydrochloric acid, impurities are separated from the dissolved solution to obtain a nickel solution, and a nickel salt such as nickel sulfate or nickel oxide is produced by techniques such as neutralization and crystallization. Alternatively, nickel metal may be produced by performing electrolytic winning or the like.

On the other hand, as a method applicable in the case of treating oxide ores, for example, a process of heating and melting the ores together with a reducing agent such as cokes so as to separate the metal from slag, and obtaining ferronickel, which is an alloy of nickel and iron, to be used as a raw material of stainless steel, has been carried out.

However, such smelting methods all require large amounts of energy, and large cost and extensive efforts are required for the separation of impurities.

Particularly, in recent years, high quality ores have been depleted, and securement thereof is no longer easy. As a result, the nickel level in the available ores tends to be lowered, and thus more cost and efforts are required now to obtain nickel from these low level raw materials.

Thus, recently, a method of obtaining a nickel salt or nickel metal by subjecting low level oxide ores that have not been traditionally used as raw materials, to acid leaching at high temperature under pressure, and neutralizing the leached solution with an alkali such as slaked lime, has been developed.

This method is a technology capable of effectively utilizing low level resources with effective and relatively less energy; however, when it is intended to obtain nickel salts such as described above, new problems not found in conventional smelting methods are emerging.

For example, magnesium, manganese, and the like that are contained in ores are mostly distributed to the slag in the smelting method of using a furnace as described above, and the metals are distributed less to the matte. As a result, the amount of incorporation thereof into nickel salts was limited to a very low level, and the incorporation hardly caused any problem.

On the contrary, in a smelting method using high temperature pressure leaching, magnesium or manganese is thoroughly leached by acid, and consequently, incorporation of the elements into nickel salts is also increased. Furthermore, in the high temperature pressure leaching, an operation of adding an alkali to the leached slurry thus obtained to adjust the pH is carried out, but the influence of the incorporation of calcium that is used as a neutralizing agent to the nickel salts cannot be neglected.

Particularly, when nickel is used in a material for lithium ion batteries or nickel hydrogen batteries, if magnesium, calcium, or chloride ions are co-present, these ions largely affect the characteristics of a battery obtained as a final product. Therefore, high purity nickel salts in which the incorporation is excluded as much as possible from the stage of producing the nickel salts, are considered desirable.

However, in order to obtain nickel sulfate, which is one of nickel salts, with high purity, for example, a method of crystallizing nickel sulfate, such as by obtaining nickel first as metal according to a method such as electrolytic winning, dissolving this metal again in sulfuric acid, and then concentrating the dissolved liquid, may also be considered. However, in order to obtain metal, significant electric power and facilities of a corresponding scale are needed, so that when energy efficiency or cost is taken into consideration, the method is not an advantageous method.

Furthermore, ores containing nickel also simultaneously contain cobalt in many cases. Cobalt is also a valuable metal, and it is not necessary for cobalt to co-exist with nickel. Therefore, the metals are separated and respectively collected.

As an efficient and practical method for separating nickel and cobalt in a sulfuric acid solution, solvent extraction is used in many cases. For example, Japanese Unexamined Patent Publication No. 10-310437 discloses an example of separating nickel and cobalt by extracting cobalt by solvent extraction using trade name: PC88A (manufactured by Daihachi Chemical Industry Co., Ltd.) as an extractant.

When PC88A is used as this extractant, the behavior of extraction of magnesium or calcium is also similar to the behavior of nickel. Therefore, when a solution containing nickel at a high concentration is submitted to solvent extraction, there occurs a problem that the efficiency of separating magnesium or calcium is decreased, such as that the extraction efficiency of magnesium or calcium is decreased.

On the other hand, Japanese Unexamined Patent Publication No. 10-30135 discloses a method for producing an aqueous solution of high purity nickel which does not include any sodium or ammonia, from an aqueous nickel solution containing calcium, magnesium, cobalt and the like as impurities, by extracting and separating impurities in the aqueous nickel solution using an alkylphosphonic acid ester or an alkylphosphinic acid, each containing nickel, as an extractant.

According to the method suggested in Japanese Unexamined Patent Publication No. 10-30135, in which nickel is extracted in advance into an organic solvent at a high pH, and this organic solvent containing the extracted nickel is brought into contact with the nickel solution containing impurities, there occurs an exchange reaction by which elements that are more likely to be extracted than nickel are transferred to an organic phase, while nickel in the organic solvent is transferred to an aqueous phase, and impurities in the nickel solution can be removed.

Furthermore, this is also effective as a method for preventing impurity elements such as sodium that are included in a pH adjusting agent, from being incorporated into the nickel solution and contaminating the product.

However, even in a liquid washing step for nickel sulfate as suggested in Japanese Unexamined Patent Publication No.

10-30135, magnesium in the solution exhibits a behavior similar to that of nickel, and it has been difficult to remove magnesium.

Furthermore, in a case in which impurities such as iron or aluminum are included in a large amount in a nickel-containing material that serves as a raw material, if it is intended to separate these by methods such as neutralization, a large amount of neutralizing agents is required. Further, when impurities are precipitated, there is a possibility that valuable materials such as nickel and cobalt may also be co-precipitated and be lost. Thus, it has not been easy to perform an efficient operation.

Due to such reasons, there has been a demand for a practical method in which high purity nickel sulfate that has a low level of magnesium or chloride and can be used in a battery raw material can be efficiently obtained from a sulfuric acid acidic solution containing a large amount of metal ions of magnesium or the like, or chloride ions.

In view of such circumstances, an object of the present invention is to provide a method for producing high purity nickel sulfate having a low level of impurities, particularly a low level of metal ions such as magnesium or chloride, by adjusting the concentration of an extractant and the pH concentration at the time of treatment in a step of obtaining a nickel sulfate solution with a high nickel concentration by solvent extraction using an acidic organic extractant.

SUMMARY OF THE INVENTION

A first aspect of the present invention for solving such a problem is a method for producing high purity nickel sulfate, characterized by treating an acidic solution containing nickel through at least the following steps (1) to (4):

[Steps]
(1) Sulfurization Step
adding a sulfurizing agent to an acidic solution containing nickel, and obtaining a precipitate of nickel sulfide and a solution after sulfurization;
(2) Redissolution Step
preparing a slurry of the nickel sulfide obtained in (1) sulfurization step, adding an oxidizing agent to the slurry, and thereby obtaining a concentrated solution of nickel;
(3) Solution Purification Step
subjecting the concentrated solution of nickel obtained in (2) redissolution step, to neutralization by addition of a neutralizing agent, and thereby obtaining a neutralized precipitate and a concentrated solution of nickel after iron removal thus produced; and
(4) Solvent Extraction Step
subjecting the concentrated solution of nickel after iron removal obtained in (3) solution purification step, to solvent extraction, and thereby obtaining a stripped liquid and a nickel sulfate solution.

A second aspect of the present invention is a method for producing high purity nickel sulfate, characterized in that the redissolution in the redissolution step according to the first aspect of the invention is carried out at a temperature in the range of from 60° C. to 180° C.

A third aspect of the present invention is a method for producing high purity nickel sulfate, characterized in that the oxidizing agent that is added in the redissolution step according to the first and second aspects of the invention is one or more oxidizing agents selected from air, oxygen, a hydrogen peroxide solution, and ozone gas.

A fourth aspect of the present invention is a method for producing high purity nickel sulfate, characterized in that the neutralization in the solution purification step according to the first to third aspects of the invention is carried out by adding an alkali as a neutralizing agent, and thereby adjusting the pH to the range of from 5.0 to 6.0.

A fifth aspect of the present invention is a method for producing high purity nickel sulfate, characterized in that the solvent extraction for the concentrated solution of nickel after iron removal in the solvent extraction step according to the first to fourth aspects of the invention is carried out using an acidic phosphoric acid ester-based extractant as an extractant.

A sixth aspect of the present invention is a method for producing high purity nickel sulfate, characterized in that the nickel sulfate solution obtained in the solvent extraction step according to the first to fifth aspects of the invention is subjected to a crystallization step to obtain nickel sulfate crystals.

A seventh aspect of the present invention is a method for producing high purity nickel sulfate, characterized in that a preliminary sulfurization step of the following step (1a) is carried out before the sulfurization step according to the first to sixth aspects of the invention is carried out:

Step (1a): A preliminary sulfurization step of adding a sulfurizing agent to an acidic solution containing nickel, and sulfurizing in advance impurities that are more easily sulfurized than nickel to separate the impurities.

An eighth aspect of the present invention is a method for producing high purity nickel sulfate, characterized in that the acidic solution containing nickel (also referred to as nickel-containing acidic solution) according to the first to seventh aspects of the invention is a solution obtained by adding sulfuric acid or hydrochloric acid to any one or more of nickel oxide ore, nickel matte, nickel sulfide, mixed sulfide of nickel and cobalt, crude nickel sulfate produced from a copper smelting process, and nickel oxide, nickel hydroxide, nickel carbonate, nickel powder, nickel metal, a nickel hydrogen battery, a lithium ion battery, and a defective product or a partly finished product generated in the production processes of those materials and thereby leaching nickel.

(a) Nickel sulfate with a low magnesium level, which is adequate as a raw material for secondary batteries, can be obtained.

(b) High purity nickel sulfate can be obtained directly from an acidic solution obtained by acid leaching a nickel oxide ore.

(c) Even if the raw material level or the operation load fluctuates, nickel sulfate of stable quality can be obtained.

DETAILED DESCRIPTION OF THE PREFERRED EMBODIMENTS

Hereinafter, a method for producing high purity nickel sulfate of the present invention will be described.

The present invention is intended to obtain high purity nickel sulfate that can be used even in a raw material for nickel hydrogen batteries or lithium ion batteries, from sulfides containing metal ions of nickel, magnesium and the like.

Figure 1:
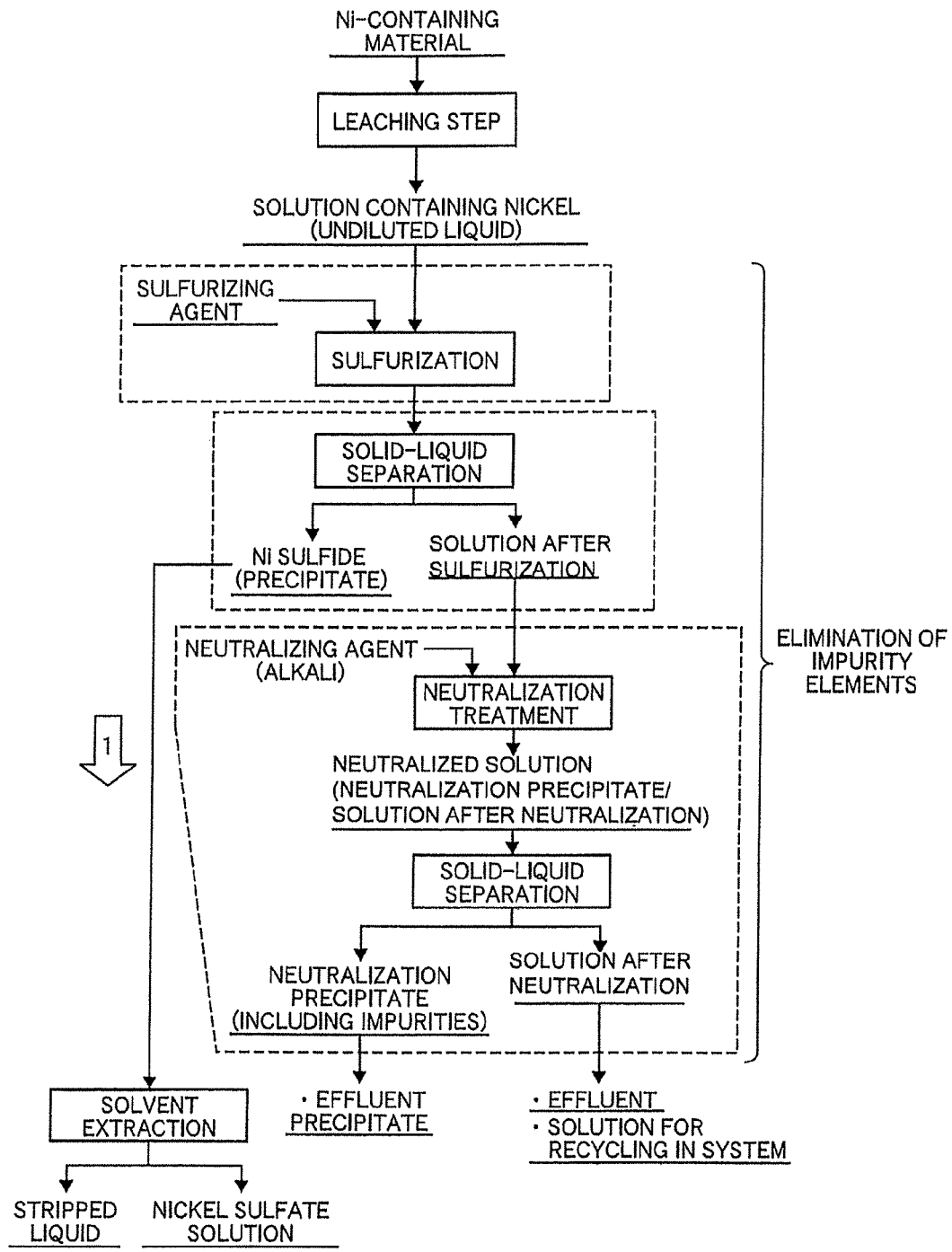
FIG. 1 is a process diagram illustrating an example of a method for producing high purity nickel sulfate.

FIG. 1 is a process diagram illustrating an example of the method for producing high purity nickel sulfate, and the process usually proceeds along the void arrow 1, from sulfurization by addition of a sulfurizing agent to a nickel solution containing nickel, and thus a high purity nickel sulfate solution is produced. During the production process, impurity elements are eliminated from nickel-containing materials by going through the processes surrounded by "broken lines", and are discharged out of the system as effluent or as an effluent precipitate. However, magnesium among the impurity elements exhibits a reaction behavior similar to that of nickel in a solution, and in this situation, removal of magnesium from the solution containing nickel is not sufficiently achieved.

Under such circumstances, for the acidic solution containing nickel that serves as a raw material used in the present invention, use can be made of a solution obtained by adding a mineral acid such as sulfuric acid or hydrochloric acid to nickel oxide ore, nickel matte, nickel sulfide, mixed sulfide of nickel and cobalt, crude nickel sulfate produced in a copper smelting process, and a wide variety of materials containing nickel, including nickel chemical products such as nickel oxide, nickel hydroxide, nickel carbonate, and nickel powder; nickel metal; batteries such as a nickel hydrogen battery and a lithium ion battery; and an excess product or a defective product generated in the processes for producing batteries such as nickel hydrogen batteries or lithium ion batteries, and then leaching nickel.

Even among such solutions obtained by leaching nickel, it is effective to use a solution in which magnesium, manganese and calcium in particular are accumulated or concentrated, or an acidic solution which uses the foregoing solution as a portion.

Furthermore, when the present invention is applied to a solution having high magnesium, manganese and calcium concentrations and a low nickel concentration, an attempt can be made to reduce the amount of the sulfurizing agent to cause precipitation of nickel in the form of sulfide, and thus it is economically efficient.

The present invention is characterized in that production is achieved through at least the following steps (1) to (4), and depending on the acidic solution state of the raw material, production of high purity nickel with higher efficiency can be achieved when the step of (1a) is added.

[Production Steps]

(1) Sulfurization Step

A sulfurization step is a step of adding a sulfurizing agent to an acidic solution containing nickel, and obtaining a precipitate of nickel sulfide and a solution after sulfurization.

(2) Redissolution Step

A redissolution step is a step of preparing a slurry of the nickel sulfide obtained in the sulfurization step of (1), adding an oxidizing agent to the slurry, and thereby obtaining a concentrated solution of nickel.

(3) Solution Purification Step

A solution purification step is a step of subjecting the concentrated solution of nickel obtained in the redissolution step of (2), to a neutralization process by addition of a neutralizing agent, and thereby obtaining a neutralized precipitate and a concentrated solution of nickel after iron removal thus produced.

(4) Solvent Extraction Step

A solvent extraction step is a step of subjecting the concentrated solution of nickel after iron removal obtained in the solution purification step of (3) to solvent extraction, and obtaining a stripped liquid and a nickel sulfate solution.

(1a) Preliminary Sulfurization Step

A preliminary sulfurization step is a step of adding a sulfurizing agent to an acidic solution containing nickel, sulfurizing in advance impurities that are more easily sulfurized than nickel, and thereby separating the impurities.

Figure 2:
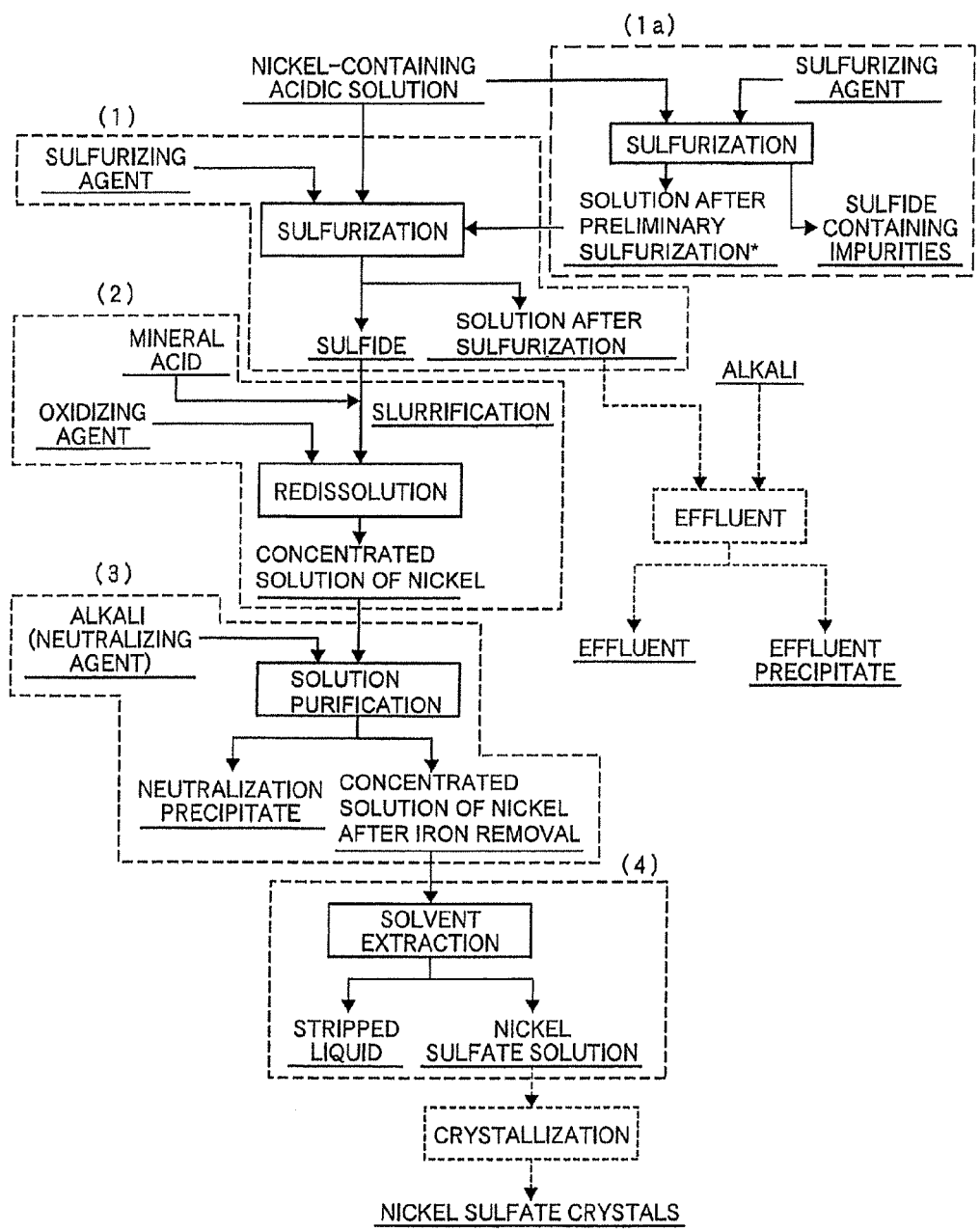
FIG. 2 is a smelting process diagram illustrating a production process for nickel sulfate according to the present invention.

Hereinafter, the details of the various production processes will be described using FIG. 2. FIG. 2 is a diagram of the smelting process of the present invention.

(1) Sulfurization Step [Including the Description for (1a) Preliminary Sulfurization Step]

In the first sulfurization step, sulfurization is carried out by adding a sulfurizing agent to the acidic solution containing nickel described above, and thereby nickel component in the acidic solution is precipitated as nickel sulfide.

This sulfurization can be carried out using a known method. For example, sulfurization can be carried out by adding a gaseous or liquid sulfurizing agent while measuring the oxidation-reduction potential (ORP) and pH of the acidic solution.

At this time, elements that are prone to form sulfides, such as cobalt, zinc, copper, and lead, produce sulfides and precipitate in the same manner as nickel. Therefore, in a case in which an acidic solution containing a large amount of impurities such as copper, zinc, and lead is used as a starting raw material, a preliminary sulfurization step (1a) of selectively separating in advance only impurities such as copper, zinc, and lead, by limiting the amount of addition of the sulfurizing agent to the extent that nickel does not precipitate, or strictly controlling the oxidation-reduction potential of the acidic solution, is carried out prior to the sulfurization step of sulfurizing nickel. Thereby, the load in the subsequent steps can be reduced, and thus it is preferable.

Meanwhile, when nickel is precipitated as sulfide, magnesium, manganese, calcium, chromium, aluminum, sodium, potassium and the like do not form sulfides, and remain in the solution, except for a portion that causes entrainment or attachment. Therefore, most of them can be separated from nickel.

There are no particular limitations on the sulfurizing agent to be used, but an agent that is easily available in a large amount, such as hydrogen sulfide gas, sodium hydrosulfide, or sodium sulfide, can be used.

The sulfurization temperature of the sulfurization step and the preliminary sulfurization step is not particularly limited, but the sulfurization temperature is preferably 40° C. to 80° C.

If the temperature is lower than 40° C., the reaction time is excessively lengthened, and the facility capacity for securing the required throughput is increased. Furthermore, if the temperature is higher than 80° C., since resin-based materials such as vinyl chloride and FRP, which are used in reaction vessels or piping, cannot be used, the material of the facilities is limited, and the investment on facilities is increased.

After completion of sulfurization, nickel sulfide and the solution after sulfurization are subjected to solid-liquid separation.

The method for this solid-liquid separation is not particularly limited, and a solid-liquid separation apparatus to be used is not particularly limited, while a pressurized filtration apparatus, a suction filtration apparatus, a decanter, and the like can be used.

When a portion of nickel sulfide containing recovered nickel as a main component is repeatedly subjected to the sulfurization step as crystal seeds, the particle size of the sulfide can be increased, and attachment or entrainment of impurities can be suppressed.

(2) Redissolution Step

Next, a mineral acid such as hydrochloric acid or sulfuric acid is added to the sulfide obtained in sulfurization step of (1) to obtain slurry, subsequently an oxidizing agent is added thereto, and nickel is leached by being dissolved in acid again. At the time of this leaching, the process can be carried out by, for example, introducing the sulfide into a solution in which the concentration of sulfuric acid has been adjusted to 100 g/l to 300 g/l, to produce slurry, and heating the slurry to 60° C. to 100° C. while adding an oxidizing agent to the slurry.

Furthermore, it is advantageous if a pressurized vessel such as an autoclave is used, and for example, a temperature of 160° C. or higher is applied, since the sulfide can be rapidly dissolved. Additionally, when leaching is achieved at a temperature of 100° C. or higher using a pressurized vessel, even if sulfuric acid such as described above is not added, sulfur of the sulfide is oxidized to produce sulfuric acid, and nickel sulfate can be easily obtained.

A higher leaching temperature allows the reaction to proceed more rapidly. Furthermore, when the leaching temperature is higher than 200° C., the reaction proceeds even more rapidly, the iron that remains or is incorporated produces insoluble iron oxide, and can be efficiently separated from nickel.

However, a vessel of a material which endures a temperature exceeding 200° C. is very expensive and increases the investment, and also requires the cost necessary for heating, or the expenses and efforts for maintenance. Therefore, it is preferable to operate at a temperature of about 160° C. to 180° C., at which the process can be handled conveniently at low cost.

(3) Solution Purification Step

In the previous redissolution step of (2), impurities that have been entrained or attached to the sulfide are also eluted into the solution, but since the sulfide is fine, an unignorable amount of impurities are eluted in many cases.

Therefore, a solution containing impurities after the solid-liquid separation is subjected to a solution purification step of precipitating heavy metals such as iron and aluminum as a neutralized precipitate by a neutralization treatment of adding an alkali.

When neutralization is carried out, it is preferable to adjust the target pH to the range of 5.0 to 6.0. If the pH is less than 5.0, removal of aluminum is insufficient, and if the pH is more than 6.0, even nickel begins to precipitate and is lost, which is not preferable.

The neutralizing agent to be used is not particularly limited, but sodium hydroxide, potassium hydroxide, calcium hydroxide, magnesium hydroxide, or the like can be used.

(4) Solvent Extraction Step

Next, the acidic solution obtained by acid leaching nickel sulfide contains cobalt that has a chemical behavior similar to that of nickel, but since cobalt exists even after the solution purification step, separation thereof is necessary.

It is effective to carry out separation of nickel and cobalt by performing solvent extraction of the solution that has passed through the solution purification step.

Regarding the extractant used in the solvent extraction, an acidic phosphoric acid ester-based extractant can be used.

When the various steps described above are carried out, magnesium, manganese, and calcium can be selectively discharged from the system of the process for producing nickel sulfate, accumulation of impurities in the production process is suppressed, and high purity nickel sulfate can be produced.

Furthermore, the high purity nickel sulfate produced according to the present invention can be provided in the form of a nickel sulfate solution, or can be provided as nickel sulfate crystals formed by using a general crystallization method such as crystallization or spray drying.

Furthermore, in the present invention, the raffinate in the solvent extraction step of (4) is neutralized by adding an alkali, impurities such as magnesium are separated by causing them to precipitate, and the liquid obtained after the separation may be recycled as an undiluted liquid for the process of re-leaching nickel sulfide. As such, when the liquid obtained after separating impurities is repeatedly used, an increase in the amount of liquid in the process can be suppressed, and at the same time, the load of the removal of impurities at the effluent treatment process can be reduced.

In regard to the neutralization at the effluent treatment process, it is preferable to adjust the pH to the range of about 7.5 to 9.

Furthermore, similarly, a method of adding an alkali to the solution after sulfurization that is obtainable after sulfurizing an acidic solution, thereby separating impurities that did not produce any precipitate in the sulfurization step, and subjecting a solution after neutralization thus obtained to an effluent treatment, can also be used.

EXAMPLES

Hereinafter, the present invention will be described using Examples.

Example 1

Sulfurization Step 400 ml of a sulfuric acid acidic solution containing nickel at the composition indicated in Table 1 was isolated, and the temperature of the solution was maintained at 40° C. using a water bath. While the solution was stirred at 300 rpm using a stirrer, a sulfurizing agent was added thereto. Meanwhile, for the sulfurizing agent, a solution obtained by dissolving sodium sulfide nonahydrate in water and adjusting the concentration to 500 g/L, was used.

During this sulfurization reaction, the pH was maintained at 3.0 by adding sulfuric acid at a concentration of 500 g/L. Subsequently, 136 ml of a sodium sulfide solution was added thereto, and then the slurry was sampled while being stirred. The sample was filtered, and then a quantitative analysis of various elements was carried out by ICP emission spectroscopy.

In the solution after sulfurization, as shown in Table 1, 99% or more of nickel and cobalt was precipitated, while the amount of magnesium or calcium that was separated from solution was as small as less than 3%, with most of magnesium or calcium remaining in the solution. Thus, it was found that magnesium or calcium can be separated by sulfurization.

TABLE 1

|  | Amount of Solution [ml] | Ni [g/L] | Co [g/L] | Mg [g/L] | Ca [g/L] | Mg/Ni |
|---|---|---|---|---|---|---|
| Sulfuric acid acidic solution | 400 | 27 | 6.7 | 0.46 | 0.36 | 0.017 |
| solution after sulfurization | 519 | 0.001 | 0.001 | 0.35 | 0.27 | 350 |

[Redissolution Step]

Next, 200 Dry-g of the nickel sulfide obtained in the sulfurization step (composition thereof is indicated in Table 2) was isolated, and one liter of a mixed sulfide slurry having a slurry concentration of about 200 g/L was produced by adding pure water to the nickel sulfide.

TABLE 2

|  | Ni | Co | Cu | Fe | Cr | S |
|---|---|---|---|---|---|---|
| Ni sulfide | 55.6 | 4.0 | 0.002 | 0.32 | 0.013 | 35.0 |

[unit: %]

The mixed sulfide slurry thus produced was charged into an autoclave apparatus, and the mixed sulfide slurry was heated while stirred with a stirrer at 750 to 1000 rotations per minute to thereby maintain the temperature inside the container at 160° C. to 170° C. In that state, pure oxygen was blown in from an oxygen bomb at a flow rate of 0.43 liters per minute over 4 hours, and thus the mixed sulfide was redissolved. In the middle of the course, small amounts of samples were taken from the container after the passage of 2.5 hours and 3.3 hours.

After completion of blowing for 4 hours and the reaction of redissolution, the autoclave was cooled, and the leached slurry was removed and filtered through a Nutsche filter to separate the slurry into leaching residue and a concentrated solution of nickel.

The composition of the concentrated solution of nickel thus obtained was as follows: Ni: 120 g/L, Co: 8 g/L, and Fe: 210 mg/L.

When the leaching ratio of nickel in the mixed sulfide charged is calculated from the analytic values of the residue, leaching has occurred thoroughly with a leaching ratio of 99% or higher in all cases. Particularly, leaching could be achieved at a ratio of 99.9% by performing leaching at 170° C. for 4 hours.

The changes in the nickel leaching ratio with the reaction time at the respective temperatures and applied pressures are presented in Table 3. As can be seen from Table 3, it was found that a nickel leaching ratio of 99% or higher may be obtained even for a reaction time of about from 2.5 hours to 3.3 hours.

TABLE 3

| Temperature [° C.] | Total pressure [MPa] | Reaction time [Hr] | Ni leaching ratio [%] |
|---|---|---|---|
| 170 | 1.79 | 2.5 | 99.1 |
|  |  | 3.3 | 99.7 |
|  |  | 4.0 | 99.9 |
| 160 | 1.62 | 3.3 | 99.1 |
|  |  | 4.0 | 99.5 |

Oxygen partial pressure: 0.21 [MPa], slurry concentration: 200 g/L

[Solution Purification Step]

Next, slaked lime was added to the concentrated solution of nickel thus obtained, the pH was adjusted to the range of 5.0 to 6.0, and the resultant was used as a solution after purification. After this adjustment, the filter cake and a Nutsche filter were used to perform solid-liquid separation into a solution after neutralization (concentrated solution of nickel after iron removal) and a neutralized precipitate. These were analyzed by ICP.

The results are presented in Table 4, and it could be confirmed that iron, chromium, copper, aluminum, and the like that are co-present in the concentrated solution of nickel can be effectively reduced by neutralization.

TABLE 4

|  | Ni | Co | Fe | Cr | Cu | Zn | Mn | Al | Pb | Ca | Mg | Na | Cl |
|---|---|---|---|---|---|---|---|---|---|---|---|---|---|
| Concentrated solution of nickel | 120 | 8 | 210 | 21 | 9 | 10 | 18 | 8 | 7 | 4 | 14 | 2 | 20 |
| Solution after purification | 110 | 8 | 3 | <1 | 1 | 8 | 19 | <1 | 6 | 490 | 37 | 3 | 30 |

Unit: Ni, Co [g/L], others [mg/L]

[Solvent Extraction Step]

Subsequently, 100 ml of the solution after purification obtained after pH adjustment was isolated into a separatory funnel, and an organic solvent from which nickel had been extracted in advance was added thereto such that the volume ratio between the organics (O) and the solution (A) would be O/A=3.5.

Meanwhile, for the organic solvent described above, an organic solvent obtained by mixing an acidic phosphoric acid ester-based extractant ("trade name: PC-88A" manufactured by Daihachi Chemical Industry Co., Ltd.) with a diluent ("trade name: TECLEAN N20" manufactured by JX Nippon Oil & Energy Corp.) at a volume ratio of 20:80, bringing this into contact with a nickel sulfate solution, and thereby adjusting the nickel concentration in the organic solvent to 15 g/L, was used.

Next, the separatory funnel to which the organic solvent and the solution after purification had been introduced, was shaken for 10 minutes, and left to stand, and then the mixture was separated into an organic phase and an aqueous phase after extraction. Through this extraction operation, components other than nickel, such as magnesium and cobalt, are extracted into the organic solvent, and nickel contained in the organic solvent in advance is transferred to the nickel sulfate solution at a proportion corresponding to the components other than nickel.

Subsequently, 100 ml of a sulfuric acid solution with the pH adjusted to the range of 4 to 4.5 was added to the organic phase after extraction, the mixture was shaken, and components other than nickel that were contained in the organic solvent were stripped. Thereby, an organic solvent after the stripping and a stripped liquid were obtained.

As a result, as can be seen from Table 5, a high purity nickel sulfate solution in which the amount of presence of magnesium with respect to nickel had been decreased to one-sixth, could be obtained.

TABLE 5

|  | pH | Ni [g/L] | Co [g/L] | Mg [g/L] | Mg/Ni |
|---|---|---|---|---|---|
| Solution after purification | 5.4 | 105 | 9 | 0.25 | 0.0024 |
| Nickel sulfate solution | 4.3 | 124 | <0.001 | 0.05 | 0.0004 |

Example 2

Preliminary Sulfurization Step 1800 ml of a nickel-containing sulfuric acid acidic solution containing copper and zinc at the composition indicated in Table 6 was isolated, and the temperature of the solution was maintained at 60° C. using a heater. While the solution was stirred at 300 rpm using a stirrer, a sulfurizing agent was added thereto. Meanwhile, hydrogen sulfide gas was used as the sulfurizing agent. A sealable vessel was used for the reaction.

Hydrogen sulfide was added in an amount of 2.3 equivalents with respect to the copper and zinc contained in the solution. The slurry obtained after the reaction was sampled and filtered, and then a quantitative analysis of various elements was carried out by ICP emission spectroscopy.

In a solution after preliminary sulfurization, as can be seen from Table 6, 99% or more of copper and 80% or more of zinc were precipitated, while most of nickel remained in the solution after preliminary sulfurization. Thus, it was found that copper and zinc could be separated by preliminary sulfurization.

TABLE 6

| Amount of addition of $H_2S$ [mol] | Equivalent of $H_2S$ (Zn + Cu) | pH | ORP [mV] | Ni [g/L] | Zn [g/L] | Cu [g/L] |
|---|---|---|---|---|---|---|
| 0 | 0 | 3.15 | 386 | 10.0 | 0.40 | 0.20 |
| 0.006 | 0.38 | 2.65 | 276 | 10.2 | 0.40 | 0.036 |
| 0.011 | 0.73 | 2.74 | 214 | 10.2 | 0.40 | 0.003 |
| 0.014 | 0.91 | 2.7 | 160 | 10.2 | 0.40 | <0.001 |
| 0.015 | 1.01 | 2.62 | 100 | 10.2 | 0.40 | 0.006 |
| 0.016 | 1.07 | 2.74 | −41 | 10.3 | 0.40 | 0.002 |
| 0.019 | 1.28 | 2.69 | −79 | 10.3 | 0.36 | <0.001 |
| 0.025 | 1.66 | 2.48 | −69 | 10.3 | 0.22 | <0.001 |
| 0.033 | 2.26 | 2.32 | −64 | 10.4 | 0.073 | <0.001 |

In the following, this solution after preliminary sulfurization was used as a nickel-containing acidic solution, and a nickel sulfate solution having a composition as indicated in Table 6 was produced by the same procedure as in Example 1.

From Table 6, it was found that a high purity nickel sulfate solution may be obtained from a nickel-containing acidic solution containing large amounts of copper and zinc of the raw materials.

Comparative Example 1

A hydrochloric acid acidic solution prepared by leaching a mixed sulfide obtained by subjecting nickel and cobalt together with sulfur to sulfidizing roasting, by a known method of using chlorine gas, was subjected to a solvent extraction process under the same conditions as in Example 1, and was stripped. Thus, a nickel sulfate solution having the composition indicated in Table 7 was obtained.

The levels of impurities such as copper, magnesium, and chloride ion were all higher compared to the case of the present invention indicated in Table 4.

TABLE 7

|  | Ni | Co | Fe | Cr | Cu | Zn | Mn | Al | Pb | Ca | Mg | Na | Cl |
|---|---|---|---|---|---|---|---|---|---|---|---|---|---|
| Nickel sulfate solution | 106 | 23 | 43 | 5 | 1500 | 15 | 400 | 28 | 35 | 480 | 270 | 37 | 160 |

Unit: Ni, Co [g/L], others [mg/L]

That is, it was understood that according to the present invention using a sulfurization step, a high purity nickel sulfate solution having low levels of the impurities described above may be obtained.

The invention claimed is:

1. A method for producing high purity nickel sulfate, comprising performing a sulfurization step by adding a sulfurizing agent to an acidic solution containing nickel, and obtaining a precipitate of nickel sulfide and a solution;

performing a redissolution step by preparing a slurry of the nickel sulfide and adding an oxidizing agent to the slurry, to obtain a concentrated solution of nickel;

performing a solution purification step by subjecting the concentrated solution of nickel to neutralization by adding a neutralizing agent, and thereby obtaining a neutralized precipitate and a concentrated solution of nickel after iron removal thus produced; and performing a solvent extraction step by subjecting the concentrated solution of nickel after iron removal to solvent extraction, and thereby obtaining a stripped liquid and a nickel sulfate solution.

2. The method for producing high purity nickel sulfate of claim 1, wherein the redissolution step of (2) is carried out at a temperature in the range of from 60° C. to 180° C.

3. The method for producing high purity nickel sulfate of claim 1, wherein the oxidizing agent that is added in the redissolution step of (2) is at least one oxidizing agent selected from air, oxygen, a hydrogen peroxide solution, and ozone gas.

4. The method for producing high purity nickel sulfate of claim 1, wherein the neutralization in the solution purification step of (3) is carried out by adding an alkali as a neutralizing agent and thereby adjusting the pH to the range of from 5.0 to 6.0.

5. The method for producing high purity nickel sulfate of claim 1, wherein the solvent extraction for the concentrated solution of nickel after iron removal in the solvent extraction step is carried out using an acidic phosphoric acid ester-based extractant as an extractant.

6. The method for producing high purity nickel sulfate of claim 1, wherein the nickel sulfate solution obtained in the solvent extraction step is converted to nickel sulfate crystals through a crystallization step.

7. The method for producing high purity nickel sulfate of claim 1, further comprising a preliminary sulfurization step before the sulfurization step
the preliminary sulfurization including adding a sulfurizing agent to an acidic solution containing nickel, and preliminarily sulfurizing impurities that are more easily sulfurized than nickel to separate the impurities.

8. The method for producing high purity nickel sulfate of claim 1, wherein the acidic solution containing nickel is a solution obtained by adding sulfuric acid or hydrochloric acid to any one or more of nickel oxide ore, nickel matte, nickel sulfide, mixed sulfide of nickel and cobalt, crude nickel sulfate produced by a copper smelting process, and nickel oxide, nickel hydroxide, nickel carbonate, nickel powder, nickel metal, a nickel hydrogen battery, a lithium ion battery, and defective products or partly finished products generated in the production processes thereof; and thereby leaching nickel.

* * * * *